Aug. 20, 1929.   P. C. PINKERTON   1,725,158
AUTOMOBILE LOCKING DEVICE
Filed June 20, 1927
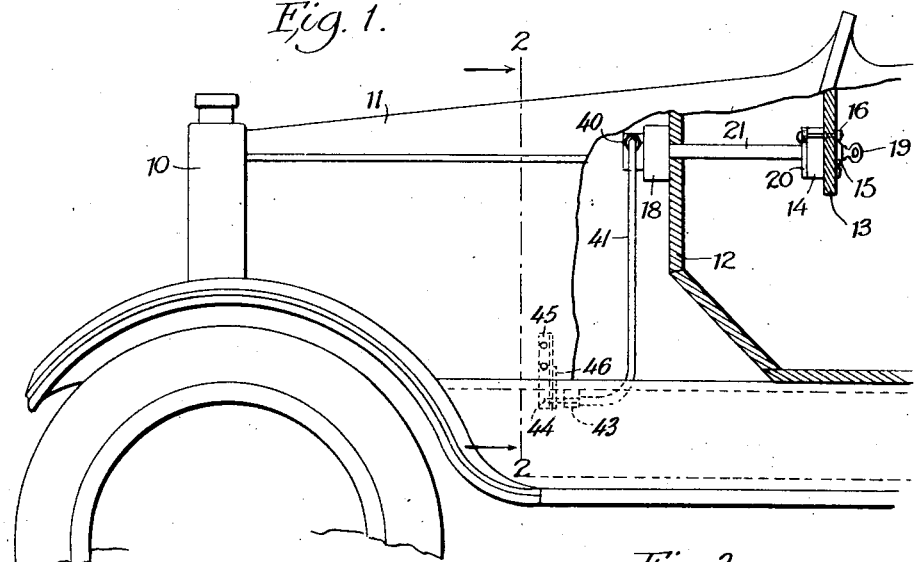
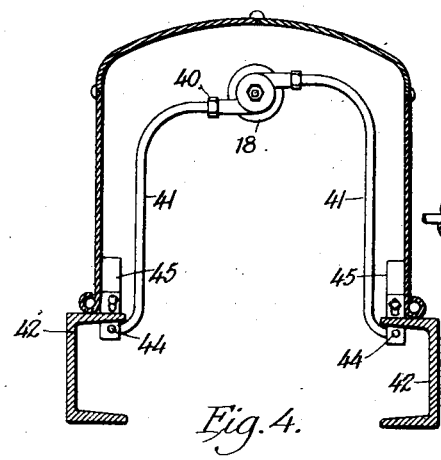
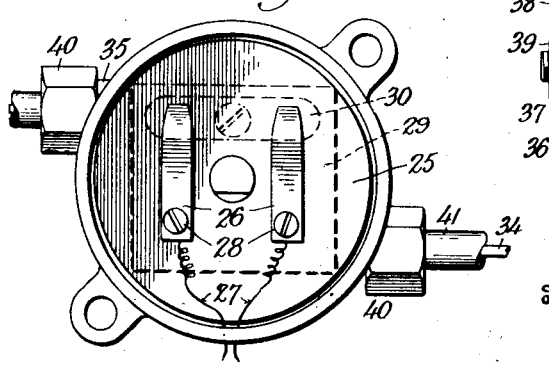
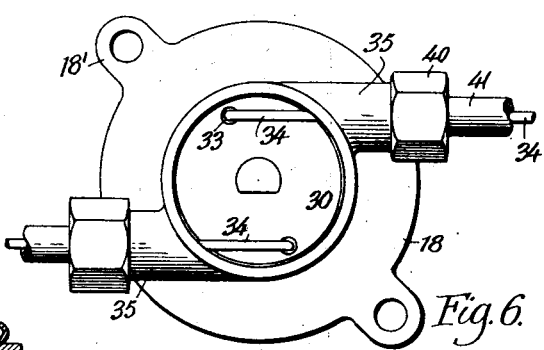
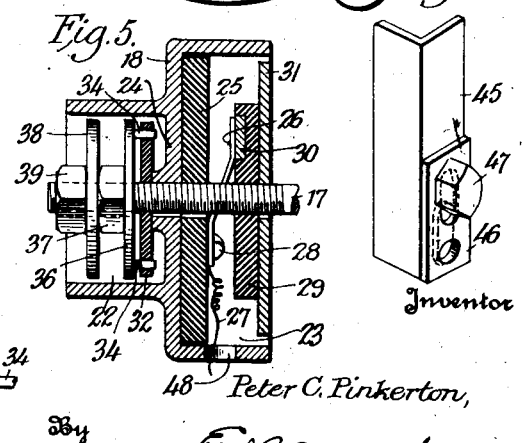
Inventor
Peter C. Pinkerton,
Attorney Patented Aug. 20, 1929.

1,725,158

UNITED STATES PATENT OFFICE.

PETER C. PINKERTON, OF INDIANAPOLIS, INDIANA.

AUTOMOBILE LOCKING DEVICE.

Application filed June 20, 1927. Serial No. 200,183.

My invention relates to a combined hood and ignition lock for automobiles and it is an object of the invention to provide means whereby the owner of an automobile may lock the hood in closed position and break the ignition circuit by turning a key upon the instrument board, and it is also an object of the invention to provide a device of this character which is of great practical value for preventing theft of automobiles but is of simple and inexpensive construction and may be applied to an automobile of ordinary or standard construction without altering the same, all as will be hereinafter more fully described and claimed.

Referring to the accompanying drawings which are made a part hereof and on which similar reference characters indicate similar parts, Figure 1 is a fragmentary side elevation of an automobile with parts broken away to illustrate the application of my invention, Figure 2 is a transverse section on the line 2—2 of Fig. 1.

Figure 3 is a front elevation of the switch housing.

Figure 4 is a rear elevation of the switch housing.

Figure 5 is a vertical section of the housing.

Figure 6 is a perspective of one of the fastening elements mounted on the inside of the hood.

In the drawings reference character 10 indicates an automobile having a hood 11, a dash 12 and an instrument board 13. Upon the instrument board 13 is mounted a lock casing 14 in which is disposed a lock 15, said lock casing and lock being secured to the instrument board by means of bolts 16. The lock 15 has a lock shaft 17 connected thereto and such shaft extends through the dash 12 and into a casing or housing 18 secured by lugs 18' on the front side of said dash, said bolt 17 being adapted to be operated by a key 19 in the lock 15 at the front of the instrument board. The lock casing 14 is provided with a closure plate or cover 20 which has fixed thereto a sleeve or lock shaft housing 21 for protecting the locking bolt and preventing its being rotated except by the key 19. This sleeve or casing 21 is preferably hardened by heat treatment to prevent its being easily mutilated by saws or other similar instruments so that access may be had to the lock shaft.

The casing or housing 18 is provided with front and rear compartments 22 and 23, in the former of which is mounted means for projecting and retracting the hood locking mechanism and in the latter compartment 23 is arranged the mechanism for making and breaking the ignition circuit. The compartments 22 and 23 open in opposite directions and are divided by means of a partition or web 24 having a central perforation through which the lock shaft 17 extends. That part of the lock shaft 17 which extends through the housing 18 is preferably threaded as shown and is flattened at one side and forms a substantially D-shaped body for cooperation with rotary elements mounted on a shaft and which have cooperating D-shaped openings so that when the shaft is rotated they will be similarly rotated.

In the rear compartment 23, which is the nearest the dash, is mounted a disk 25 of insulating material such disk being provided with a pair of spaced spring contact fingers 26 to which are attached ignition wires 27 and said spring contact fingers are each secured at one end by means of screws 28 to the disk 25 and have their opposite ends disposed in spaced parallel relation to the disk 25. A rotatable contact element 29 of insulating material is non-rotatably mounted upon the lock shaft 17 such rotatable contact element being provided with a central D-shaped opening corresponding to the shape of the lock shaft 17 and this contact element 29 is provided with a bridge piece 30 counter-sunk in one face thereof and adapted to engage the free ends of the contact fingers for completing the electric circuit across the contacts 26 when the bridge piece 30 is rotated by the lock shaft. A washer 31 forms a closure for the compartment 23 and serves as a thrust washer for the contact element 29.

The bottom of the switch casing 18 is provided with an opening 48 which forms both a drainage passage and a passage for the ignition wires 27.

In the forward compartment 22 is disposed a disk 32 which is provided with a D-shaped opening by means of which it is also non-rotatably mounted upon the lock shaft 17, and said disk 32 is provided with diametrically disposed openings 33 in which are disposed the right angular inner end portions of operating wires or flexible connections 34 which extend through integrally formed tangentially arranged nipples 35. The extremity of the lock shaft 17 is provided with a washer or disk 36 held in place by a nut 37, such washer maintaining the bent ends of the wires within the apertures in the disk so that when the disk is rotated said wires will be reciprocated. Another washer 38 and nut 39 may be provided for locking the first-mentioned locking nut in position. The nipples 35 are connected by means of nuts 40 with pipes or tubes 41 formed of relatively inexpensive stiff material. The pipes or tubes 41 form casings for the wires 34 and extend downwardly and beneath the upper flanges of the frame or chassis channel members 42 and longitudinally of the said frame members and are secured thereto by means of clamps 43. The flexible wires 34 extend through the tubes or casings 41 and are provided at their outer ends with locking bolts 44 arranged to engage fastening elements 45 carried by the hood 11. The fastening elements 45 are substantially L-shaped and are preferably spot welded in vertical position to the inside of the hood so that one side of the L will be disposed at substantially right angles to the inner surface of the hood. The chassis or frame members 42 have their upper inwardly extending angular portions slotted to permit the fastening elements 45 to extend therethrough for engagement by the locking bolts 44.

In order to permit relative adjustment between the locking bolts 44 and the fastening elements 45, the fastening elements 45 are provided with openings and slots for cooperation with oppositely arranged slots and openings in plates 46, the parts being held together by means of bolts 47. By this construction the plate 46 may be raised or lowered relative to the fastening element 45 to vary the height of the opening in the plate 46 through which the locking bolt extends for locking the hood in closed position.

In the operation of the device when the key 19 is turned the contact element 29 and bridge piece 30 carried thereby are rotated by the lock shaft 17 until the circuit across the flexible contact plates 26 is completed or broken and at the same time the disk 32 is rotated for projecting and retracting the flexible wires 34 and the locking bolts or plungers 44 from the cooperating fastening elements 45 on the hood.

It will be understood from the foregoing construction that the disk 25, upon which the flexible contact fingers are mounted, and the rotary contact element 29 carrying the bridge piece 30 may be reversed and by reversing these parts it will be unnecessary to use the thrust washer 31.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. The combination of a switch housing, a key controlled rotatable lock shaft in said housing, a disk non-rotatably mounted on said shaft and having eccentric perforations, locking wires having inturned ends journalled in said perforations, a second disk resting against said locking wires for holding them in the apertures in the first-mentioned disk, means for holding said second disk in position, and locking elements adapted to be engaged by said locking wires, substantially as set forth.

2. The combination of an automobile having a hood, of a housing mounted beneath the hood, tangentially arranged nipples formed at the side of the housing, pipes connected to said nipples and extending to a remote point, locking elements disposed adjacent the extremities of said pipes, flexible members mounted in said pipes for cooperation with said locking elements, the inner ends of said flexible elements extending through said nipples into said housing, and a rotatable shaft in said housing, and a rotatable member mounted on said shaft, said wires being eccentrically connected to said member whereby when the member is rotated the flexible elements will be projected and retracted, substantially as set forth.

3. The combination of an automobile having a hood, of a housing mounted beneath the hood, a lock shaft in said housing, a rotatable member on said lock shaft, locking elements mounted on said hood, oppositely disposed tangentially arranged nipples formed at the sides of said housing, pipes connected to said nipples and extending to a point adjacent said locking elements, flexible members mounted in said pipes for cooperation with said locking elements, the inner ends of said flexible members being eccentrically connected to said rotatable member whereby when the member is rotated the flexible members will be propelled and repelled into and out of engagement with the locking elements on the hood, substantially as set forth.

In witness whereof, I have hereunto set my hand at Indianapolis, Indiana, this 23rd day of May, A. D. nineteen hundred and twenty-seven.

PETER C. PINKERTON.